J. B. COLLINS.
TIRE CARRIER.
APPLICATION FILED MAY 2, 1918.
1,419,958.  Patented June 20, 1922.
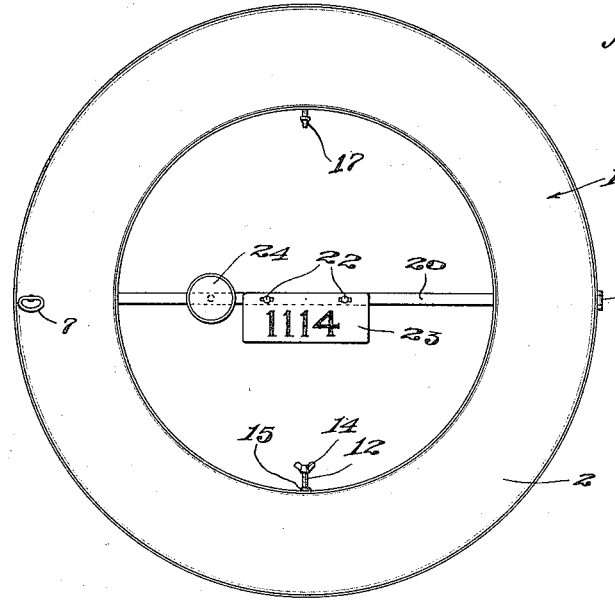
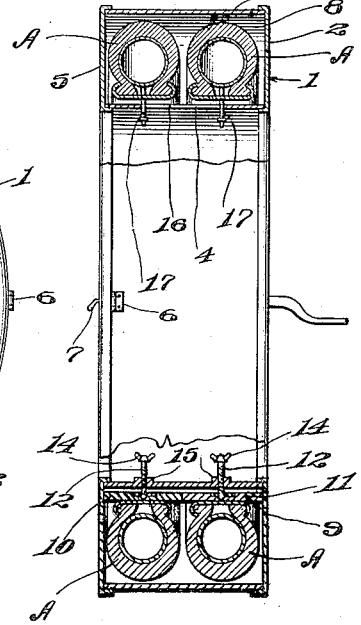
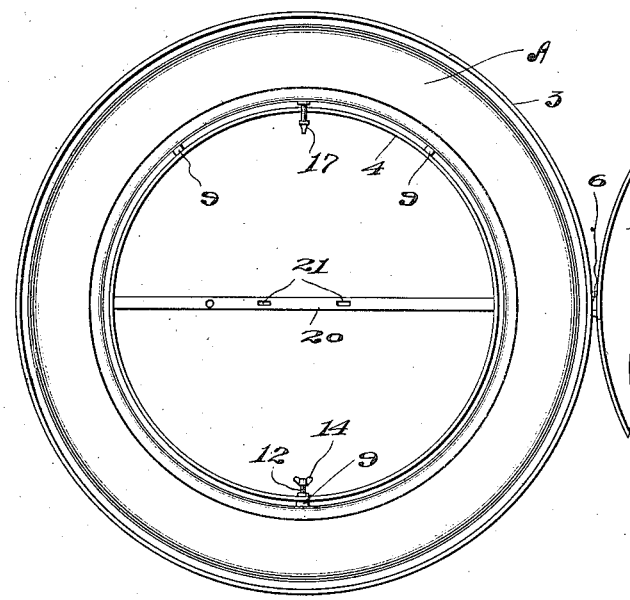
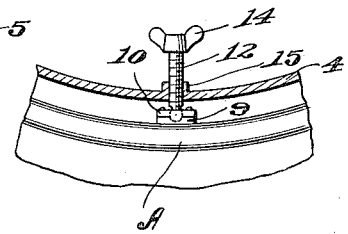
Inventor
J. B. Collins,
By Lancaster Allwine
his Attorneys

UNITED STATES PATENT OFFICE.

JOSEPH B. COLLINS, OF DETROIT, MICHIGAN.

TIRE CARRIER.

1,419,958.　　　　Specification of Letters Patent.　　Patented June 20, 1922.

Application filed May 2, 1918. Serial No. 232,139.

*To all whom it may concern:*

Be it known that I, JOSEPH B. COLLINS, a citizen of the United States, and a resident of Detroit, in the county of Wayne and State of Michigan, have invented certain new and useful Improvements in a Tire Carrier, of which the following is a specification.

This invention relates to tire trunks or carriers for use upon automobiles and an object of the invention is to provide a tire carrier which may be attached to the body of an automobile at a convenient location and comprises a circular body having one side open which open side is closed by a hinged door; and further to provide adjustably mounted bars within the body of the tire carrier for engagement against the inner peripheries of the rims of a tire structure for securely clamping the tires in place within the carrier to prevent rattling or loose movement of the tires within the carrier.

Other objects of the present invention will appear in the following detailed description, taken in connection with the accompaying drawing forming a part of this specification, and in which drawing:

Figure 1 is a side elevation of the improved tire carrier.

Figure 2 is a vertical section through the tire carrier.

Figure 3 is a side elevation of the carrier having the cover or door removed.

Figure 4 is a fragmentary enlarged detail of a part of the tire carrier.

Referring more particularly to the drawing, 1 designates the body of the tire carrier as an entirety, which body is circular in shape, having its central portion open as clearly shown in Fig. 1 of the drawing and it comprises a side ring 2, an outer annular ring or plate 3, an inner annular plate 4 and a cover 5. The edges of the circular plate 2 are bent over the edges of the annular plates 3 and 4 which engage against the inner surface of the plate 2 and secured thereto in any suitable manner, such as by crimping, soldering or the like. The door or cover 5 is hingedly connected as shown at 6 to the body 1 and it may have any suitable type of locking mechanism indicated generically at 7, for locking the cover or door in closed position. The annular plates 3 and 4 are spaced, to provide a circular interior or recess 8 within the body 1 which is of sufficient width to receive two vehicle tires of the pneumatic type, indicated by the letters A, in Figs. 2 and 3 of the drawing. A plurality of spacing bars 9 are attached to the inner surface of the annular plate 4 in circumferential spaced relation and the bar 9 at the bottom of the tire casing is composed of sections 10 and 11. The sections 10 and 11 are arranged in endwise engagement with each other, and each of them is connected to the inner annular plate 4 by a screw 12 which has swiveled connections, through the medium of a ball and socket joint 13 with the bar section. The bolts 12 have heads 14, preferably of the wing-nut type thereon and they are adjustably carried by suitable bosses 15 formed upon the plate 4, so that by the adjustment of the bolts 12, the bar sections 10 and 11 may be moved inwardly or outwardly with respect to the inner annular plate 4 for securely clamping tires placed within the casing 1, in position to prevent accidental movement of the tires within the casing and also to prevent the rattling thereof. By adjusting the bar sections 10 and 11 independently, they may be employed in connection with a single tire in the case or with two tires, as desired and when they are forced into clamping engagement with the rim of a tire, it forces the inner periphery of the rim, at a remote point, into engagement with the bars 9.

The inner annular plate 4 is provided with a slot 16 extending transversely therein which is provided to permit the seating of the valve stem 17 of the tire structure therein.

A bar 20 is attached to the back of the casing or carrier 1 and extends diametrically across the central open face in the carrier. The bar 20 is provided with a pair of spaced slots 21 adapted to receive suitable bolts 22 for connecting a license plate 23 thereto. A tail light indicated at 24 may also be attached to the bar 20.

Having thus fully described the invention what is claimed is:

1. A tire carrier comprising an annular hollow body open at one side to receive a plurality of rims with tires in superposed relation, transverse supporting bars located at one side of the body adapted to initially receive demountable rims thereon, a smooth surfaced clamping plate arranged transversely in the opposite side of the body over which the rims are adapted to fit, and means for independently adjusting the opposite ends of the clamping plate to bind the same against the tires.

2. A tire carrier comprising a circular hollow body adapted to receive a plurality of tires in superposed relation, supporting bars fixed transversely in one side of the body to support the tires, a smooth broad-surfaced clamping plate arranged transversely in the body to receive the tires thereover, and independent set screws threaded in transverse alinement in the body and movable radially therein for engagement against the opposite ends of the clamping plate to tilt the same for receiving the tires thereon and for guiding the tires into position in the body, said set screws being adapted to be further turned against the clamping plate to bind the same evenly across the inner surfaces of the tires.

JOSEPH B. COLLINS.